US009215840B2

(12) United States Patent
Johnson et al.

(10) Patent No.: US 9,215,840 B2
(45) Date of Patent: Dec. 22, 2015

(54) SEED INDUCTOR FOR AN AGRICULTURAL IMPLEMENT HAVING AN AIR BYPASS CHANNEL

(71) Applicant: CNH Canada, Ltd., Saskatoon (CA)

(72) Inventors: Chad M. Johnson, Arlington Heights, IL (US); Frank C. Legner, III, Odell, IL (US); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 131 days.

(21) Appl. No.: 13/737,852

(22) Filed: Jan. 9, 2013

(65) Prior Publication Data

US 2014/0193213 A1 Jul. 10, 2014

(51) Int. Cl.
*B65G 53/36* (2006.01)
*A01C 7/08* (2006.01)

(52) U.S. Cl.
CPC .................................... *A01C 7/081* (2013.01)

(58) Field of Classification Search
CPC ......... A01C 7/08; A01C 7/082; A01C 7/0841
USPC ....................... 406/86, 95, 144, 153; 111/174
See application file for complete search history.

(56) References Cited

U.S. PATENT DOCUMENTS 2,764,111 A * 9/1956 Collins .......................... 111/70
2,861,527 A * 11/1958 Phillips ......................... 111/186
3,073,265 A * 1/1963 Movilla et al. ................ 111/109
3,490,654 A * 1/1970 Fischer ......................... 406/123
3,633,522 A * 1/1972 Main ............................. 111/69
4,060,181 A * 11/1977 Grataloup ...................... 406/93
4,106,414 A * 8/1978 Vastag .......................... 111/200
4,246,469 A * 1/1981 Merlo ............................ 377/6
4,257,534 A * 3/1981 Williams ........................ 222/1
4,280,419 A 7/1981 Fischer
4,296,695 A * 10/1981 Quanbeck ..................... 111/186
4,453,866 A * 6/1984 Ryan ............................. 406/70
4,669,922 A * 6/1987 Hooper et al. ................ 406/157
4,718,574 A * 1/1988 Schoenmaekers ............ 221/203
4,758,119 A * 7/1988 Frase et al. ................... 406/109
4,779,765 A * 10/1988 Neumeyer .................... 222/142
4,824,295 A * 4/1989 Sharpless ..................... 406/109
5,133,270 A * 7/1992 Ledermann et al. .......... 111/130
5,161,473 A 11/1992 Landphair et al.
5,379,706 A 1/1995 Gage et al.
5,392,722 A * 2/1995 Snipes et al. ................. 111/174
5,402,741 A * 4/1995 Truax et al. .................. 111/172
5,826,523 A * 10/1998 Gregor ......................... 111/181
5,931,105 A * 8/1999 Luxon .......................... 111/170
5,939,356 A * 8/1999 Wellinghoff ................. 504/100
5,947,040 A * 9/1999 Gregor ......................... 111/174
5,979,343 A * 11/1999 Gregor et al. ................ 111/175

(Continued)

*Primary Examiner* — Joseph Dillon, Jr.
(74) *Attorney, Agent, or Firm* — Rebecca L. Henkel (57) ABSTRACT

A particulate material delivery system for an agricultural implement including, an inductor box configured to receive particulate material from a tank, the inductor box including, an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber.

10 Claims, 6 Drawing Sheets

(56) References Cited

U.S. PATENT DOCUMENTS

| | | | | |
|---|---|---|---|---|
| 5,996,516 | A * | 12/1999 | Benneweis et al. | 111/176 |
| 6,047,652 | A * | 4/2000 | Prairie et al. | 111/174 |
| 6,089,478 | A * | 7/2000 | Truan et al. | 239/675 |
| 6,148,748 | A * | 11/2000 | Bardi et al. | 111/174 |
| 6,164,222 | A * | 12/2000 | Mayerle et al. | 111/175 |
| 6,192,813 | B1 * | 2/2001 | Memory et al. | 111/176 |
| 6,213,690 | B1 * | 4/2001 | Gregor et al. | 406/123 |
| 6,253,693 | B1 * | 7/2001 | Mayerle et al. | 111/174 |
| 6,267,067 | B1 | 7/2001 | Mayerle et al. | |
| 6,273,648 | B1 * | 8/2001 | Poncelet et al. | 406/181 |
| 6,289,830 | B2 * | 9/2001 | Mayerle et al. | 111/174 |
| 6,290,433 | B2 * | 9/2001 | Poncelet et al. | 406/181 |
| 6,298,797 | B1 * | 10/2001 | Mayerle et al. | 111/175 |
| 6,564,730 | B2 * | 5/2003 | Crabb et al. | 111/185 |
| 6,595,148 | B2 * | 7/2003 | Meyer et al. | 111/63 |
| 6,609,468 | B1 * | 8/2003 | Meyer et al. | 111/174 |
| 6,644,225 | B2 * | 11/2003 | Keaton | 111/175 |
| 6,666,156 | B1 * | 12/2003 | Mayerle et al. | 111/150 |
| 6,668,738 | B2 | 12/2003 | Lee et al. | |
| 6,675,728 | B2 * | 1/2004 | Lee et al. | 111/63 |
| 6,688,244 | B1 * | 2/2004 | Meyer et al. | 111/174 |
| 6,725,788 | B2 * | 4/2004 | McCartney et al. | 111/175 |
| 6,776,108 | B2 * | 8/2004 | Crabb et al. | 111/185 |
| 6,883,445 | B2 | 4/2005 | Mayerle | |
| 6,928,941 | B1 * | 8/2005 | Sternitzke | 111/181 |
| 7,025,010 | B2 * | 4/2006 | Martin et al. | 111/175 |
| 7,093,547 | B2 | 8/2006 | Mayerle | |
| 7,182,029 | B2 | 2/2007 | Johnson et al. | |
| 7,213,525 | B2 * | 5/2007 | Meyer et al. | 111/174 |
| 7,264,423 | B2 * | 9/2007 | Kowalchuk | 406/181 |
| 7,267,061 | B2 * | 9/2007 | Mayerle | 111/174 |
| 7,334,532 | B2 | 2/2008 | Sauder et al. | |
| 7,353,760 | B2 * | 4/2008 | Mayerle et al. | 111/175 |
| 7,413,387 | B2 | 8/2008 | Pleyer | |
| 7,462,002 | B2 * | 12/2008 | Mayerle | 406/120 |
| 7,640,877 | B1 | 1/2010 | Memory | |
| 7,647,875 | B2 * | 1/2010 | Landphair et al. | 111/172 |
| 7,669,538 | B2 * | 3/2010 | Memory et al. | 111/174 |
| 7,690,440 | B2 * | 4/2010 | Dean et al. | 172/179 |
| 7,752,984 | B2 | 7/2010 | Memory | |
| 7,779,769 | B2 * | 8/2010 | Memory | 111/174 |
| 7,779,770 | B2 | 8/2010 | Sauder et al. | |
| 7,806,061 | B2 | 10/2010 | Memory | |
| 7,866,269 | B2 | 1/2011 | Naylor et al. | |
| 8,033,230 | B2 * | 10/2011 | Naylor et al. | 111/176 |
| 8,079,317 | B2 | 12/2011 | Anderson et al. | |
| 8,234,987 | B2 * | 8/2012 | Georgison et al. | 111/176 |
| 8,448,585 | B2 * | 5/2013 | Wilhelmi et al. | 111/175 |
| 2001/0013309 | A1 * | 8/2001 | Mayerle et al. | 111/174 |
| 2004/0163578 | A1 * | 8/2004 | McDonald et al. | 111/175 |
| 2004/0206283 | A1 * | 10/2004 | Mayerle | 111/130 |
| 2008/0018970 | A1 * | 1/2008 | Miyanagi et al. | 359/197 |
| 2008/0105445 | A1 * | 5/2008 | Dayton et al. | 172/105 |
| 2008/0295751 | A1 * | 12/2008 | Shoup et al. | 111/174 |
| 2010/0017073 | A1 * | 1/2010 | Landphair | 701/50 |
| 2010/0037807 | A1 * | 2/2010 | Henning et al. | 111/84 |
| 2010/0326339 | A1 * | 12/2010 | Georgison et al. | 111/175 |
| 2011/0162566 | A1 | 7/2011 | Wilhelmi et al. | |
| 2011/0282556 | A1 * | 11/2011 | Klenz et al. | 701/50 |
| 2012/0036914 | A1 * | 2/2012 | Landphair et al. | 73/1.16 |
| 2012/0042815 | A1 * | 2/2012 | Wonderlich | 111/174 |
| 2012/0174843 | A1 * | 7/2012 | Friggstad | 111/174 |
| 2012/0174844 | A1 * | 7/2012 | Friggstad | 111/175 |
| 2012/0272881 | A1 * | 11/2012 | Georgison et al. | 111/175 |
| 2014/0190378 | A1 * | 7/2014 | Johnson et al. | 111/174 |
| 2014/0190379 | A1 * | 7/2014 | Johnson et al. | 111/174 |
| 2014/0190380 | A1 * | 7/2014 | MacDonald et al. | 111/174 |
| 2014/0193211 | A1 * | 7/2014 | Connors et al. | 406/117 |
| 2014/0193212 | A1 * | 7/2014 | Johnson et al. | 406/122 |
| 2014/0193214 | A1 * | 7/2014 | Johnson et al. | 406/122 |
| 2014/0193215 | A1 * | 7/2014 | Connors et al. | 406/136 |
| 2014/0261116 | A1 * | 9/2014 | Redman et al. | 111/174 |

* cited by examiner

SEED INDUCTOR FOR AN AGRICULTURAL IMPLEMENT HAVING AN AIR BYPASS CHANNEL

BACKGROUND

The invention relates generally to ground working equipment, such as agricultural equipment, and more specifically, to an inductor box for a pneumatic distribution system of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

BRIEF DESCRIPTION

In one embodiment, a particulate material delivery system for an agricultural implement including, an inductor box configured to receive particulate material from a tank, the inductor box including, an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber.

In another embodiment, a particulate material delivery system for an agricultural implement including, an inductor box including, a particulate material supply chamber configured to receive particulate material from a particulate material source, an air supply chamber configured to receive airflow from an airflow supply for use in conveying particulate material through the inductor box, and an air bypass channel configured to guide airflow from the air supply chamber through the particulate material supply chamber without interacting with a flow of the particulate material through the particulate material supply chamber.

In a further embodiment, a particulate material delivery system for an agricultural implement including, an inductor segment including, a particulate material supply chamber configured to receive particulate material from a particulate material tank and a first airflow from an air source, a particulate material fluidization chamber configured to mix the particulate material and the first airflow from the particulate material supply chamber, a particulate material delivery chamber configured to receive the particulate material from the particulate material fluidization chamber and to distribute the particulate material to at least one row unit, and an air bypass channel extending through the particulate material supply chamber and configured to direct a second airflow through the particulate material supply chamber and into the particulate material delivery chamber without interacting with the particulate material in the particulate material supply chamber.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
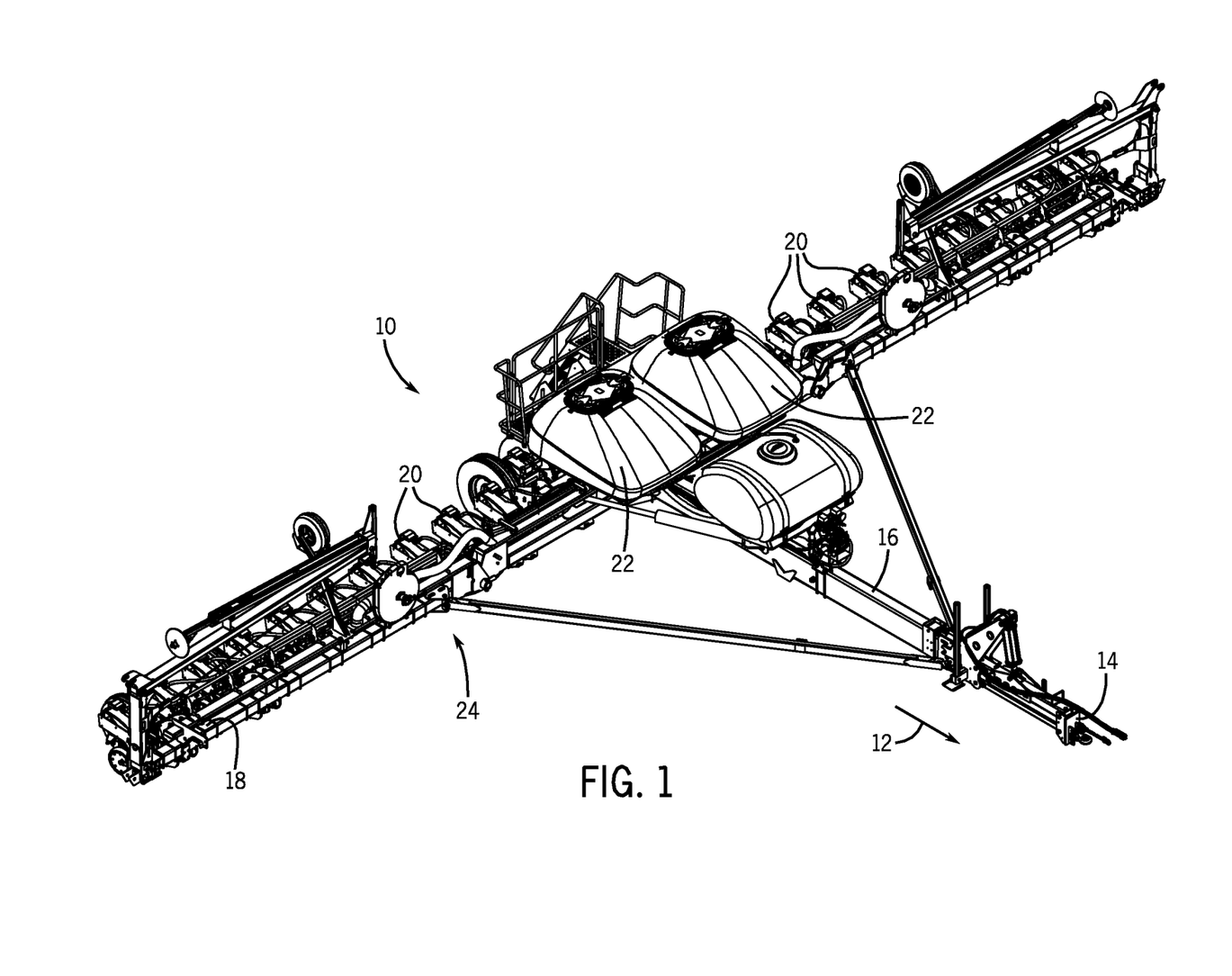
FIG. 1 is a perspective view of an embodiment of an agricultural implement configured to deposit particulate material into a soil surface.

FIG. 1 is a perspective view of an embodiment of an agricultural implement 10 configured to deposit particulate material into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit particulate material (e.g., seeds) at a desired depth beneath the soil surface, thereby establishing rows of deposited particulate material. The implement 10 also includes particulate material tanks 22, and a pneumatic distribution system 24 configured to convey particulate material from the tanks to the row units 20. In certain embodiments, the pneumatic distribution system includes an inductor box positioned beneath each particulate material tank 22. Each inductor box is configured to receive particulate material from a respective tank, to fluidize the particulate material into an air-particulate material mixture, and to distribute the air-particulate material mixture to the row units 20 via a network of pneumatic hoses/conduits (i.e., the pneumatic distribution system 24).

In certain embodiments, each row unit 20 includes a residue manager, an opening assembly, a particulate material tube, closing discs, and a press wheel. The residue manager includes a rotating wheel having multiple tillage points or fingers that break up crop residue, thereby preparing the soil for particulate material deposition. The opening assembly includes a gauge wheel and an opener disc. The gauge wheel may be positioned a vertical distance above the opener disc to establish a desired trench depth for particulate material deposition into the soil. As the row unit travels across a field, the opener disc excavates a trench into the soil for particulate material deposition. The particulate material tube, which may be positioned behind the opening assembly, directs a particulate material from a metering system into the excavated trench. The closing discs then direct the excavated soil into the trench to cover the planted particulate material. Finally, the press wheel packs the soil on top of the particulate material with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soybeans.

As mentioned above, the pneumatic distribution system 24 includes an inductor box configured to receive particulate material (e.g., seeds) from a respective tank. Depending on the desired application, the pneumatic distribution system may distribute a wide variety of seeds (e.g., light seeds, heavy seeds, large seeds, small seeds, etc). The inductor box fluidizes the particulate material from a tank 22 into an air-particulate material mixture for distribution to the row units 20 through a network of pneumatic hoses/conduits. The inductor box fluidizes and conveys particulate material through the pneumatic distribution system 24 using multiple air pathways. As will be discussed in more detail below, one of the air pathways extends through an air bypass channel and conveys airflow directly from an air supply chamber to a particulate material delivery chamber. By directing a portion of airflow directly from the air supply chamber to the particulate material delivery chamber, the air bypass channel improves airflow efficiency and the movement of particulate material out of the inductor box. As a result, an air supply (e.g., fan, blower, etc.) consumes less power and/or enhances particulate material delivery to the row units 20. Also, by directing airflow directly from the air supply chamber to the particulate material delivery chamber, the particulate/air mixture becomes less dense with particulate material, which tends to convey the particulate material in a steady stream with less surging that typically occurs with densely packed particulate/air mixtures.

Figure 2:
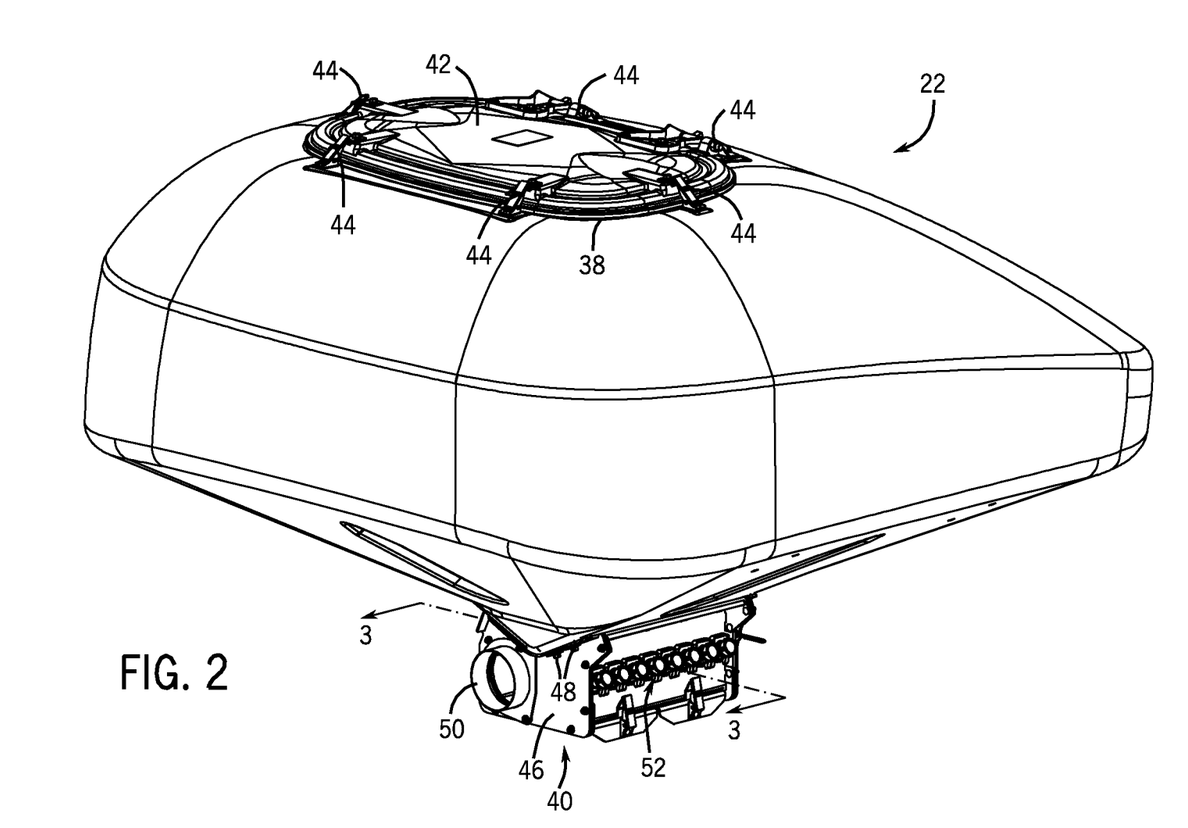
FIG. 2 is a perspective view of an embodiment of a particulate material tank coupled to an inductor box.

FIG. 2 is a perspective view of an embodiment of a particulate material tank 22 coupled to an inductor box 40. The particulate material tank 22 includes an opening 38 for receiving particulate material (e.g., seeds, etc.) for storage in the tank. The tank 22 secures the particulate material inside using a lid 42 that selectively covers the opening 38. The lid 42 securely attaches to the tank 22 with multiple fasteners 44. On the opposite side of the tank 22 from the lid is the inductor box 40. The inductor box 40 attaches to the bottom of the tank 22 and receives gravity fed particulate material for fluidization. The inductor box 40 includes a housing 46 that is coupled to the tank 22 with bolts 48. Moreover, the inductor box 40 includes an air supply port 50, and multiple inductor segments 52. It is through the air supply port 50 that the inductor box 40 receives airflow from the air supply (e.g., a fan, a blower, etc.). The airflow from the air supply enables the inductor box 40 to fluidize the particulate material and to pressurize the tank 22. In some embodiments, the tank 22 may be made of a flexible material that expands when pressurized with airflow from the air supply. As will be explained in greater detail below, the inductor box 40 directs airflow from the air supply to the inductor segments 52 and into the tank 22. The inductor segments 52 fluidize the particulate material with the airflow for delivery to the row units 20.

Figure 3:
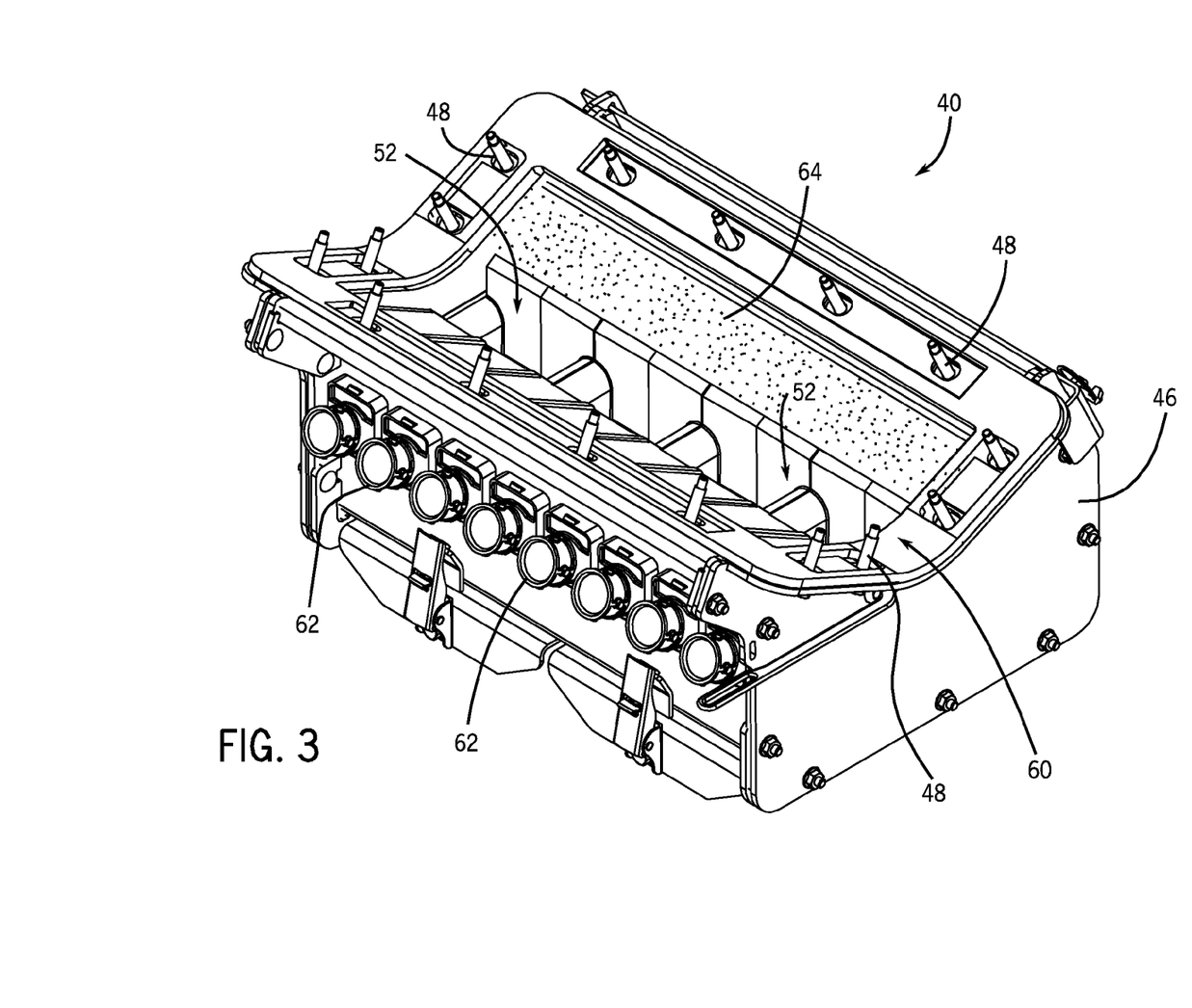
FIG. 3 is a perspective view of an embodiment of an inductor box.

FIG. 3 is a perspective view of an embodiment of an inductor box 40. As illustrated, the inductor box 40 includes multiple inductor segments 52 disposed within a chamber 60 formed by the inductor box housing 46. In the illustrated embodiment, there are eight inductor segments 52. However, other embodiments may include a different number of inductor segments 52 (e.g., 1, 2, 3, 4, 5, 6, 7, 8, 9, 10, or more). As mentioned above, the particulate material enters the inductor segments 52 from the tank, and the particulate material is fluidized (i.e., mixed with air). Once the particulate material is fluidized, airflow through air bypass channels induces the air-particulate material mixture to exit the inductor segments 52 through particulate material delivery ports 62.

Figure 4:
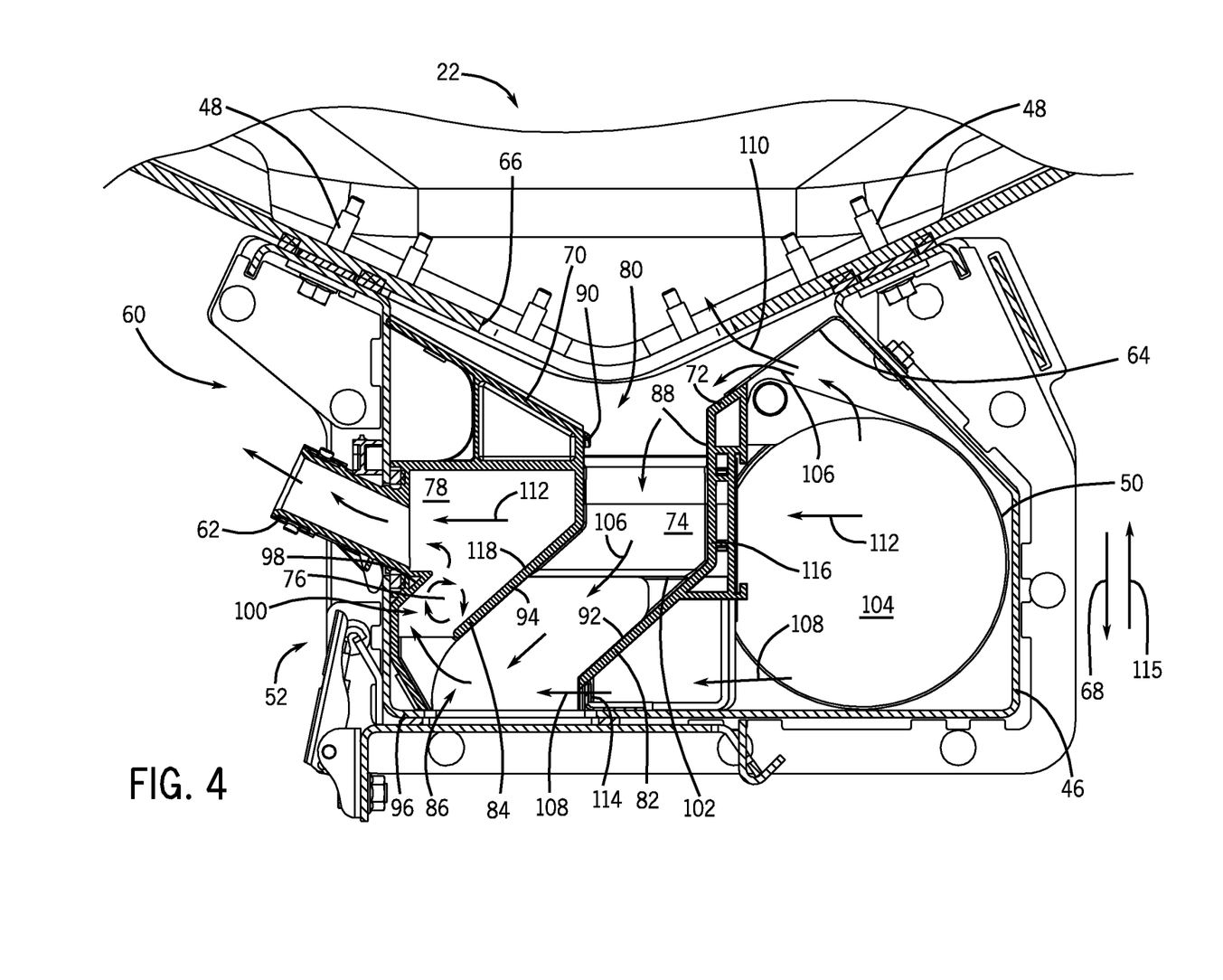
FIG. 4 is a cross-sectional side view of an embodiment of an inductor box.
Figure 5:
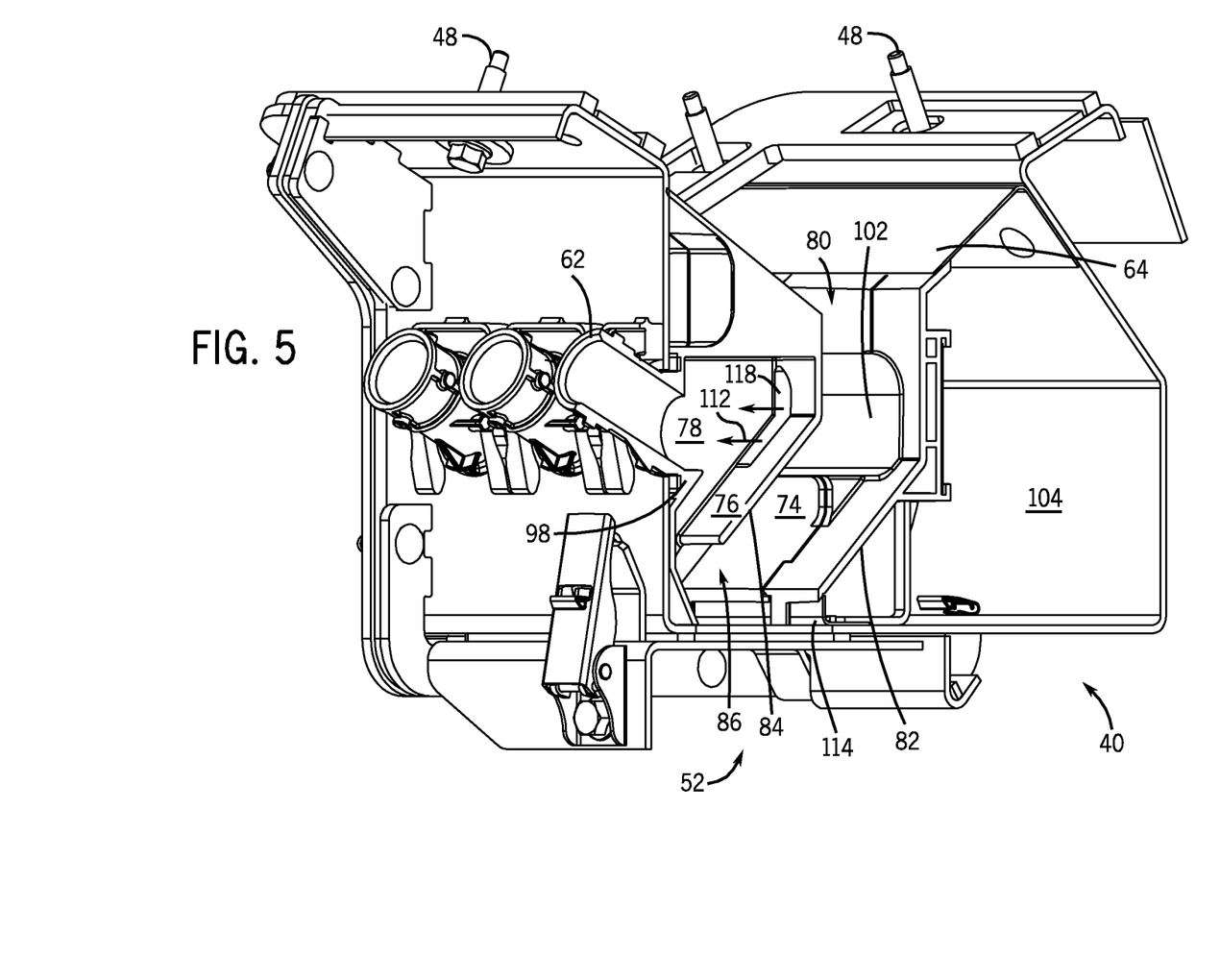
FIG. 5 is a cross-sectional perspective view of an embodiment of an inductor box.
Figure 6:
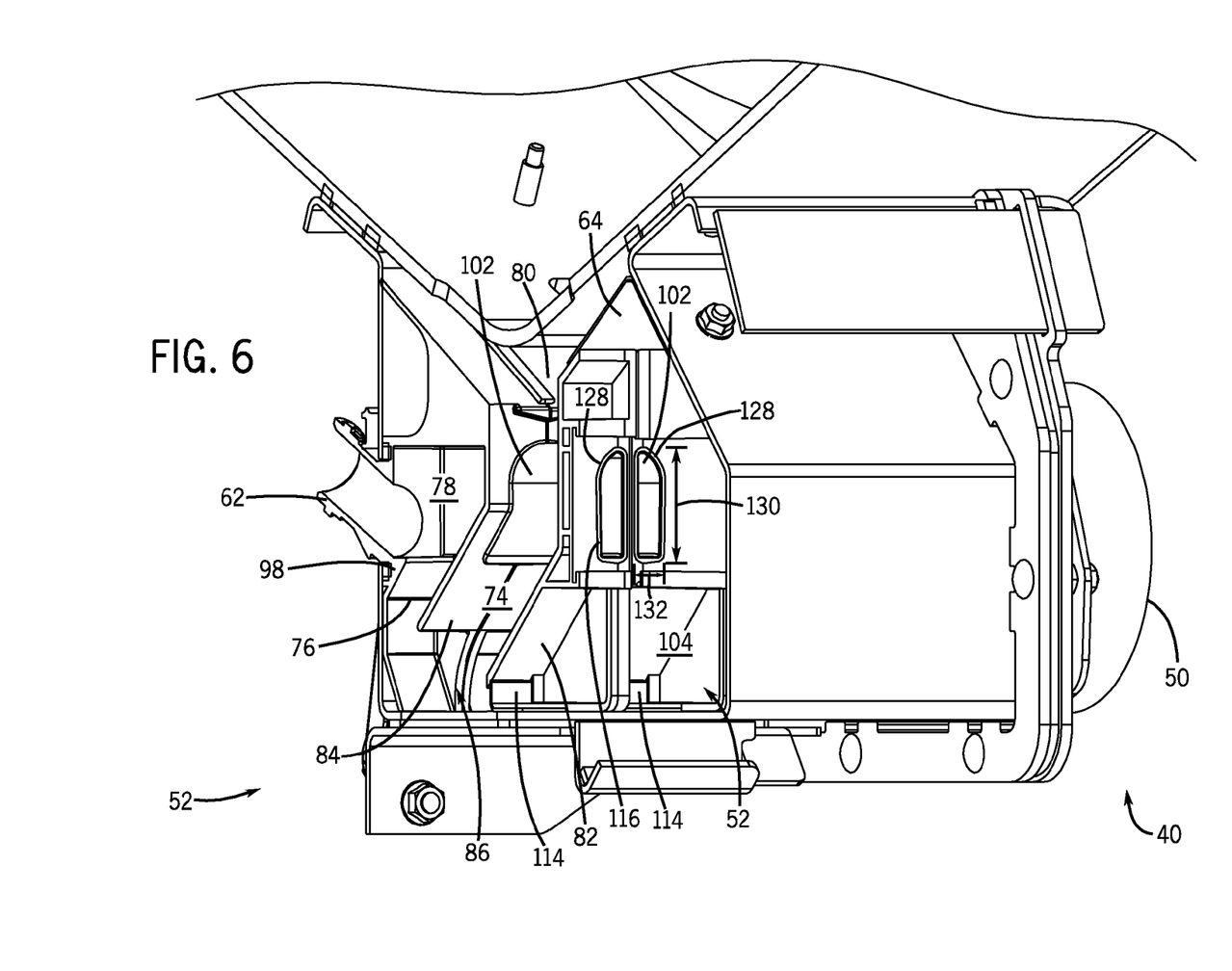
FIG. 6 is a cross-sectional perspective view of an embodiment of an inductor box.

FIG. 4 is a cross-sectional side view of an embodiment of an inductor box 40 coupled to the tank 22. As illustrated, the inductor box 40 is coupled to the tank 22 with bolts 48. The inductor box 40 surrounds a particulate material outlet(s) 66 of the tank 22, thereby enabling particulate material to exit the tank 22 and enter the inductor box 40. More specifically, as the particulate material exits the tank 22, in direction 68, the particulate material enters the inductor segment(s) 52. As explained above, the inductor box 40 includes an inductor segment 52 disposed within the inductor box chamber 60. The top of the inductor segment 52 includes two surfaces 70 and 72. The surfaces 70 and 72 may be angled to facilitate flow of particulate material into the inductor segment 52.

As particulate material flows through the inductor segment 52, the particulate material passes through a series of chambers before exiting through the particulate material delivery port 62. The chambers in the inductor segment 52 include a particulate material supply chamber 74, a fluidization chamber 76, and a particulate material delivery chamber 78. The angled surfaces 70 and 72 channel the particulate material from the tank 22 into the particulate material supply chamber 74 through a particulate material supply chamber inlet 80. The particulate material supply chamber 74 guides the particulate material from the particulate material supply chamber inlet 80 to the particulate material supply chamber outlet 86 via a first wall 82 and a second wall 84. As illustrated, the walls 82 and 84 may include respective vertical portions 88 and 90, as well as respective angled portions 92 and 94. As the particulate material flows through the particulate material supply chamber 74, the angled portions 92 and 94 of the walls 82 and 84 direct the particulate material toward the particulate material supply chamber outlet 86 at a base 96 of the inductor box 40.

Airflow from the air supply then conveys the particulate material through the particulate material supply chamber outlet 86 and into the fluidization chamber 76. The fluidization chamber 76 includes a first wall 98 and shares the second wall 84 of the particulate material supply chamber 74. If the air flow through the fluidization chamber 76 is sufficient, the particulate material will fluidize and a vortex flow is created due to the geometry of the fluidization chamber 76. The vortex 100 separates and mixes the particulate material with the airflow before the particulate material flows to the particulate material delivery chamber 78. If the air flow through the fluidization chamber 76 is sufficient the particulate material is conveyed out of the fluidization chamber 76 and into the particulate material delivery chamber 78. In the particulate material delivery chamber 78, airflow from the fluidization chamber combines with airflow from a bypass channel 102 to convey the particulate material out of the particulate material delivery chamber 78, through the particulate material delivery port 62, and to the row units 20.

As explained above, the inductor box 40 includes the air supply port 50 for receiving airflow from an air supply that pressurizes the tank 22 and conveys particulate material through the inductor segment 52. The airflow from the air supply passes through the air supply port 50 and enters an air supply chamber 104. The air supply chamber 104 extends through the inductor box 40 in a generally perpendicular direction to the flow path through the inductor segments 52, thereby supplying each inductor segment 52 with the airflow.

The air supply chamber 104 divides the airflow from the air supply into four airflow paths numbered 106, 108, 110, and 112. The first airflow path 106 passes through the first screen 64 and enters the particulate material supply chamber 74. As illustrated, the first screen 64 enables airflow to exit the air supply chamber 104, while simultaneously blocking particulate material from entering the air supply chamber 104. As the airflow through the first airflow path 106 enters the particulate material supply chamber 74, the airflow engages the particulate material and urges the particulate material in direction 68. For example, when using light particulate material (e.g., sunflower seeds, sweet corn seeds, etc.), the airflow through the airflow path 106 reduces blockage of the particulate material supply chamber 74 by providing additional force (in addition to gravity) to move the particulate material through the particulate material supply chamber 74. While the airflow through the first airflow path 106 facilitates urging the particulate material in the direction 68 through the particulate material supply chamber 74, the airflow through the second airflow path 108 conveys the particulate material out of the particulate material supply chamber 74 and into the fluidization chamber 76. The airflow through the second airflow path 108 flows through a second screen 114. The second screen 114 is coupled to the first wall 82 and to the base 96 of the inductor box 40. The second screen 114, like the first screen 64, blocks the particulate material from entering the air supply chamber 104.

A third airflow path 110 flows through the first screen 64 and into the tank 22. The airflow in the third airflow path 110 pressurizes and expands the tank 22. However, in some embodiments, the lid 42 may not create a fluid tight seal with the tank 22. Accordingly, airflow in the third airflow path 110 may provide continuous airflow into the tank 22 to replace pressurized air lost through leaks in the lid 42. As a result, airflow from the first airflow path 106 is able to flow through the particulate material supply chamber 74, and the airflow in the second airflow path 108 is able to convey the particulate material into the fluidization chamber 76. In other words, the airflow in the third airflow path 110 pressurizes the tank 22, thus equalizing pressure within the system.

The airflow in the fourth airflow path 112 flows from the air supply chamber 104 through the air bypass channel 102 and into the particulate material delivery chamber 78. The air bypass channel 102 is disposed within the particulate material supply chamber 74 and extends between the first particulate material supply chamber wall 82 and the second particulate material supply chamber wall 84. The walls 82 and 84 include respective apertures 116 and 118 that enable the airflow of the fourth airflow path 112 to pass directly through the air bypass channel 102 from the air supply chamber 104 and to the particulate material delivery chamber 78. By directing airflow directly from the air supply chamber 104 to the particulate material delivery chamber 78, the air bypass channel 102 improves airflow efficiency and flow uniformity (e.g., reduces surging of particulate material flow) of particulate material out of the inductor box 40. As a result, the air supply consumes less power and/or enhances particulate material delivery to the row units 20.

FIG. 5 is a cross-sectional perspective view of an embodiment of an inductor box 40 with the air bypass channel 102. As illustrated, the air bypass channel 102 extends through the particulate material supply chamber 74. The air bypass channel is oriented in a generally crosswise direction to the flow of the particulate material supply chamber. In this position, airflow through the air bypass channel 102 flows directly from the air supply chamber 104 to the particulate material delivery chamber 78, without interacting with the particulate material flow through the particulate material supply chamber 74. Moreover, the air bypass channel 102 is positioned above the fluidization chamber 76 and is substantially aligned with the particulate material delivery chamber 78 and the particulate material delivery port 62. Indeed, because the air bypass channel 102 is positioned above the fluidization chamber 76, the airflow through the airflow path 112 does not interfere with particulate material fluidization. Thus, during operation, the airflow in the fourth airflow path 112 engages fluidized particulate material exiting the fluidization chamber 76 and urges the particulate material through the particulate material delivery chamber 78 and through the particulate material delivery port 62. In this manner, the air bypass channel 102 improves airflow efficiency and flow of particulate material out of the inductor box 40.

FIG. 6 is a cross-sectional perspective view of an embodiment of an inductor box 40 with multiple air bypass channels 102. Indeed, each segment 52 includes an air bypass channel 102 that directs airflow from the air supply chamber 104 to the particulate material delivery chamber 78. As illustrated, the air bypass channels 102 are generally perpendicular to the air supply chamber 104. More specifically, the air bypass channels 102 have a height 130 and a width 132, with the height 130 being greater than the width 132. In this arrangement, the narrow width and tapered leading edge 128 of the air bypass channels 102 facilitate particulate material flow past the air bypass channels 102 and through the particulate material supply chamber 74. Accordingly, the air bypass channels 102 enable airflow through the particulate material supply chambers 74 without interacting with the flow of particulate material through the particulate material supply chamber 74.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A particulate material delivery system for an agricultural implement comprising:
    an inductor box configured to receive particulate material from a tank, the inductor box comprising:
        an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber.

2. The particulate material delivery system of claim 1, wherein the inductor segment comprises a particulate material delivery port configured to convey the particulate material to the at least one row unit via a pneumatic conduit.

3. The particulate material delivery system of claim 2, wherein the inductor segment comprises a particulate material delivery chamber in fluid communication with the particulate material delivery port.

4. The particulate material delivery system of claim 3, wherein the air bypass channel directs the airflow from an air supply chamber to the particulate material delivery chamber.

5. The particulate material delivery system of claim 1, wherein the air bypass channel is substantially perpendicular to the flow of the particulate material through the particulate material supply chamber.

6. The particulate material delivery system of claim 3, wherein the air bypass channel is substantially aligned with the particulate material delivery chamber and the particulate material delivery port.

7. The particulate material delivery system of claim 1, wherein a height of the air bypass channel in a first direction of the flow of the particulate material through the particulate supply chamber is greater than a width of the air bypass channel in a second direction.

8. The particulate material delivery system of claim 1, wherein the inductor box comprises a plurality of inductor segments.

9. The particulate material delivery system of claim 8, wherein each inductor segment includes a respective air bypass channel.

10. The particulate material delivery system of claim 1, wherein the particulate material supply chamber comprises a first wall and a second wall that define a path of the flow of the particulate material through the particulate material supply chamber and wherein the air bypass channel couples to the first wall and to the second wall of the particulate material supply chamber.

* * * * *